Feb. 26, 1957  G. EANNARINO  2,783,417
PLUG IN RECTIFIER ASSEMBLY
Filed March 23, 1954  2 Sheets-Sheet 1
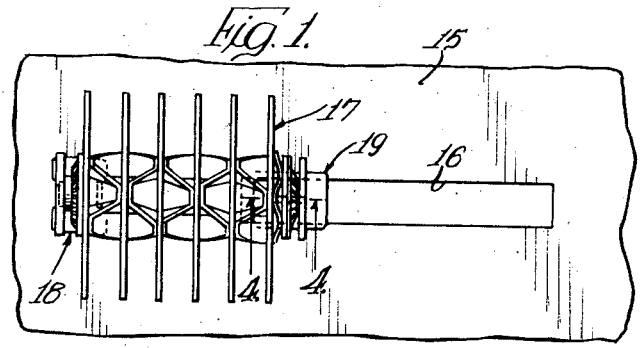
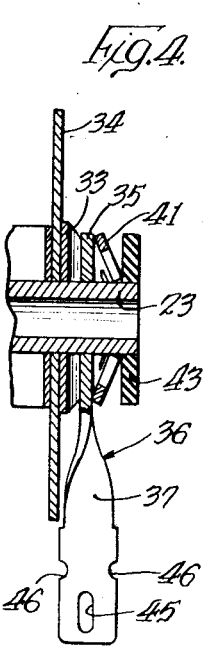
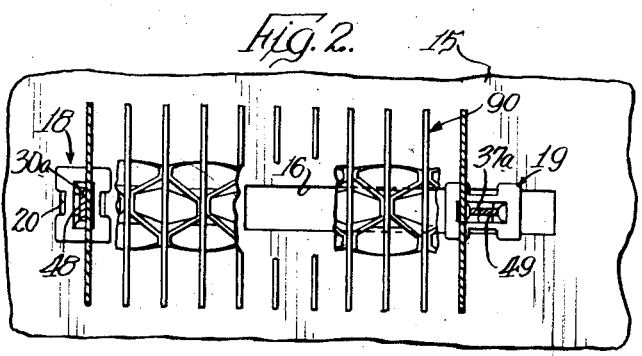
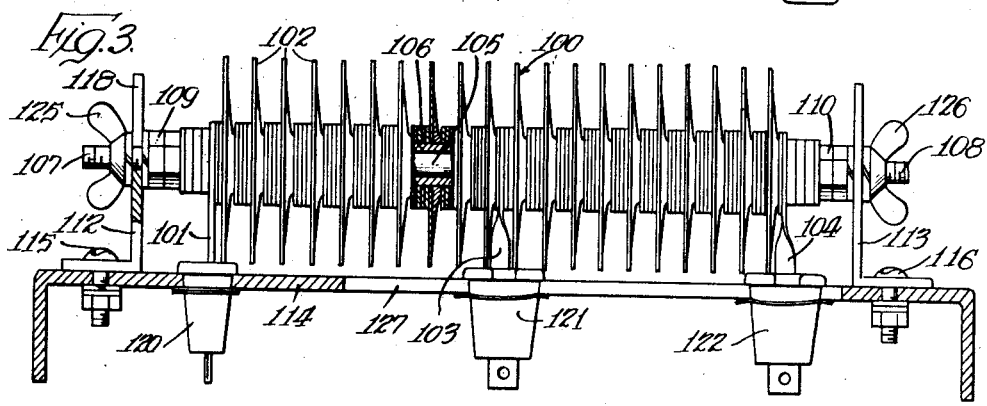
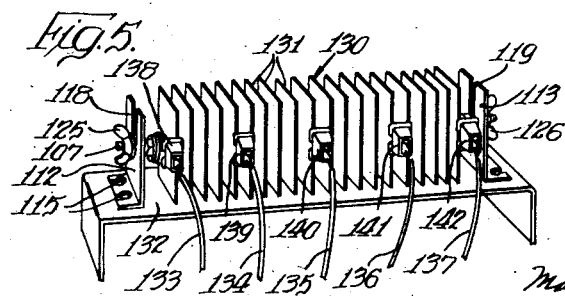
INVENTOR.
George Eannarino
BY
Attys.

Feb. 26, 1957    G. EANNARINO    2,783,417
PLUG IN RECTIFIER ASSEMBLY
Filed March 23, 1954    2 Sheets-Sheet 2
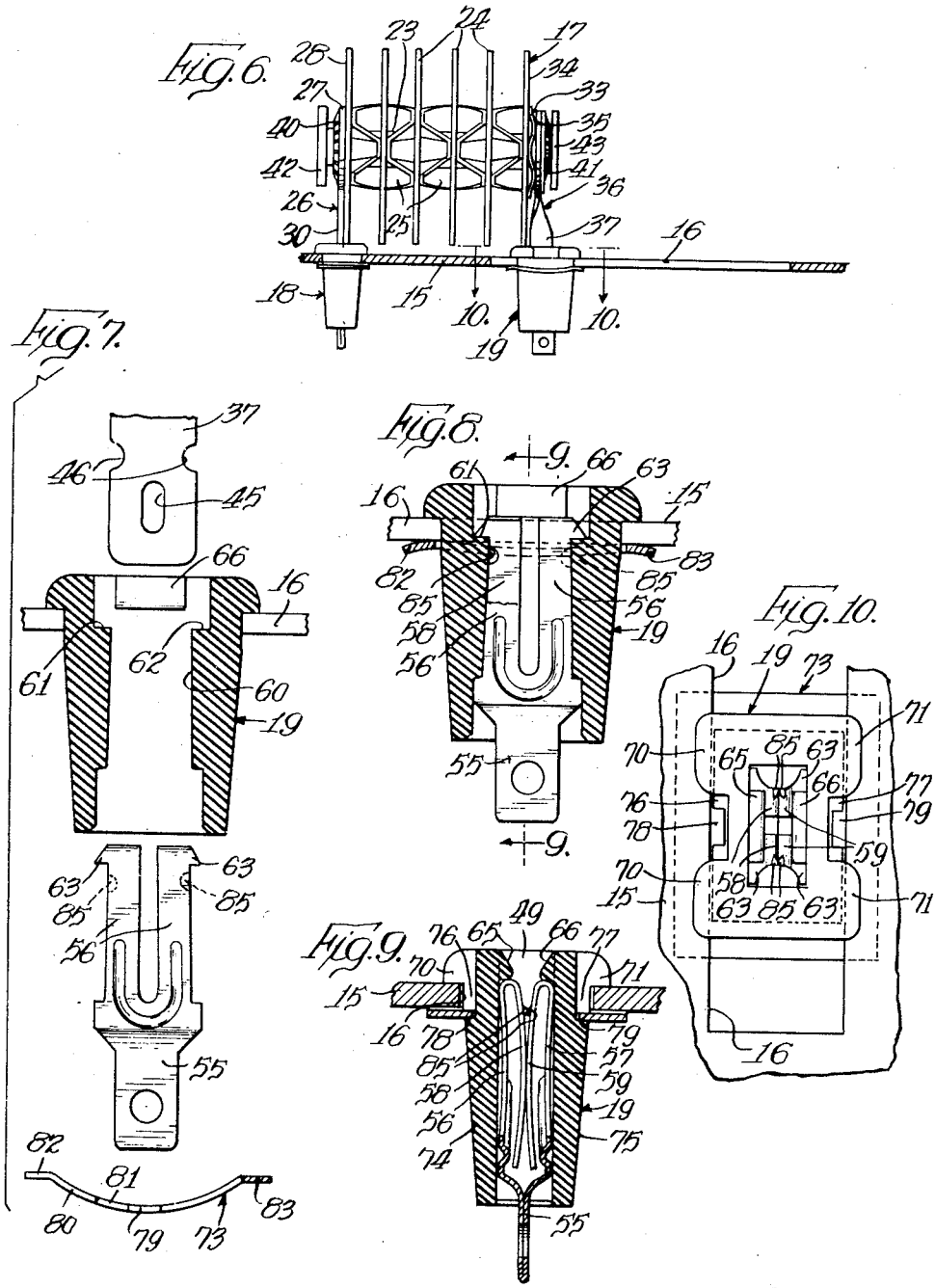
INVENTOR.
George Eannarino
BY
Mason, Kolehmainen, Rathburn & Wyss
Attys.

2,783,417

PLUG IN RECTIFIER ASSEMBLY

George Eannarino, Bloomington, Ind., assignor to Sarkes Tarzian, Inc., Bloomington, Ind., a corporation of Indiana Application March 23, 1954, Serial No. 418,134

18 Claims. (Cl. 317—234)

The present invention relates to rectifiers, more particularly to rectifiers of the dry, surface contact type, and the invention has for an object the provision of a new and improved rectifier assembly wherein the rectifier may be readily inserted into a plug in mounting arrangement without the use of any special tools and is held in place in a thoroughly reliable and shakeproof manner.

During the past few years rectifiers of the dry surface contact type, particularly selenium rectifiers, have found wide application in all phases of radio, television and electronic design and have completely changed previous concepts of D. C. power supply design. Many millions of selenium rectifiers are now in use in radio and television sets throughout the country, as well as in many other types of electronic equipment. For example, each military aircraft uses approximately twenty selenium rectifiers in the various electronic equipment thereof. Many other instances of the widespread usage of rectifiers of this type may be cited.

Most of the rectifier arrangements heretofore proposed have employed solder lugs as terminal members for the rectifier and the rectifier is actually soldered into the circuit of the radio or television receiver. Due to the normal life characteristics of these rectifiers they eventually have to be replaced with the result that the radio or television service man must take the receiver back to the shop to replace the selenium rectifier because he cannot unsolder the old rectifier and solder in the replacement rectifier in the living room of the set owner. The net result is that the replacement cost of the rectifier to the consumer is increased to approximately twice the actual cost of the rectifier itself. Accordingly, it would be desirable to provide a plug in rectifier assembly so that rectifiers can be readily replaced without moving the receiver and without requiring any appreciable service time. However, since many millions of receivers have already been sold, any such plug in rectifier arrangement should preferably be capable of being soldered in as well as plugged in so that replacements could be made with the same type of rectifier in existing sets as well as in those sets equipped for plug in rectifier operation. Furthermore, a plug in rectifier assembly should be capable of withstanding severe shock and vibration during use, since in many applications such as military electronic equipment and the like, the equipment is required to withstand severe shock and vibration tests to insure that it will function correctly under actual operating conditions in the field.

In the field of television receivers, designs have become sufficiently standardized that several different qualities of receivers may be mass produced from substantially identical chassis with different tube complements and with different rectifier power requirements. Since rectifiers of different current and voltage ratings vary considerably in length, number of plates and terminal spacing, any plug in rectifier arrangement should preferably be capable of accommodating different sizes of rectifiers so that receivers with different power requirements may all have the same standard mounting arrangement.

It is, therefore, another object of the present invention to provide a new and improved plug in rectifier which may either be plugged into suitable receptacles or may be soldered into the circuit so that existing rectifier arrangements are not rendered obsolete.

It is a further object of the present invention to provide a new and improved plug in rectifier assembly wherein the rectifier may be readily plugged into a base member and electrically connected into the circuit without the use of tools of any sort and facilities are provided for retaining the rectifier in position despite vibration of the base member.

It is a still further object of the present invention to provide a new and improved mounting arrangement for plug in rectifiers wherein rectifiers of different sizes and terminal spacings may be selectively employed with the same standard mounting arrangement and with a minimum of adjustment to conform to different terminal spacings.

Another object of the present invention resides in the provision of a new and improved receptacle for a plug in rectifier assembly which may be slidably mounted on a base member and is adapted to grip the rectifier terminal in a positive and reliable manner.

A further object of the invention resides in the provision of a shakeproof rectifier mounting arrangement wherein quick-detachable clamping means are provided for securing the rectifier to a base member while permitting rapid replacement thereof.

Briefly, in accordance with one phase of the invention a plug in rectifier assembly is provided wherein the rectifier is of the dry surface contact type and is provided with a plurality of plates positioned transversely on a tubular center post in parallel spaced relation and electrically interconnected together. A pair of terminal members are provided which are electrically connected to different ones of said plates and extend in a direction perpendicular to the center post beyond the edges of said plates, said terminal members terminating in flat end portions which are positioned at right angles to one another to provide a polarized rectifier terminal arrangement. The base member is provided with an elongated slot and a first receptacle of insulating material is positioned on the base member beyond the end of the elongated slot therein. A second receptacle of insulating material is slidably positioned in the elongated slot in the base member so that substantial variations in the spacing of the rectifier terminal members may be accommodated by adjusting the position of the second receptacle relative to the position of the first receptacle on the base member. The receptacles are provided with elongated slots adapted to receive the polarized end portions of the rectifier terminal members and electrical contact members are provided in each receptacle for establishing electrical contact with the rectifier terminal members by engagement with the opposed flat surfaces of the polarized end portions thereof. With this arrangement, the same chassis mounting structure may be employed for a plurality of radio or television receivers requiring rectifiers of different sizes, and rectifiers having different plate spacings and different numbers of plates may be selectively plugged into the mounting arrangement by merely adjusting the position of the movable receptacle within the elongated slot in the chassis or base member. In one embodiment a pair of mounting brackets are secured to the base member and extend upwardly therefrom, a mounting rod being positioned within the tubular center post of the rectifier and having end portions extending therebeyond which are adapted to fit into vertically extending notches in the upper edges of the mounting brackets and quick-detachable clamping means are provided for securing the ends of said mounting rod to the mounting brackets so that a shakeproof plug in rectifier assembly is provided wherein no tools of any kind are required to mount the rectifier and place it in service. In the alternative, the above shakeproof mounting arrangement may be employed to hold the rectifier, and individual receptacle members for each terminal member of the rectifier which are individually connected to flexible conductors may be employed to establish electrical connection to the terminal members of the rectifier without requiring special facilities for mounting the receptacles on the base member.

The invention, both as to its organization and method of operation, together with further objects and advantages thereof, will best be understood by reference to the following specification, taken in connection with the accompanying drawings, in which:

Fig. 1 is a fragmentary plan view showing a plug in rectifier assembly embodying the principles of the present invention;

Fig. 2 is a plan view similar to Fig. 1 and showing the manner in which a relatively large rectifier may be selectively plugged into the universal plug in mounting arrangement of the present invention;

Fig. 3 is a side elevational view of a plug in power rectifier assembly wherein facilities are provided for mounting the rectifier in a shakeproof manner;

Fig. 4 is a sectional view, taken along the lines 4—4 of Fig. 1 on a somewhat larger scale;

Fig. 5 is a perspective view of an alternative rectifier mounting arrangement wherein shakeproof mounting facilities are provided and the individual receptacles are secured to the ends of flexible conductors for establishing electrical contact to the terminal members of the rectifier;

Fig. 6 is a side elevational view of the plug in rectifier assembly shown in Fig. 1;

Fig. 7 is an exploded sectional view of a rectifier terminal receptacle constructed in accordance with the features of the present invention;

Fig. 8 is a sectional view similar to Fig. 7 and showing the parts of the receptacle in assembled relation;

Fig. 9 is a sectional view taken along the lines 9—9 of Fig. 8; and

Fig. 10 is a fragmentary plan view showing the receptacle of Fig. 8.

Referring now to the drawings, and more particularly to Figs. 1, 2, 4 and 6 thereof, the plug in rectifier assembly of the present invention is therein illustrated in conjunction with a base member indicated generally at 15, which may comprise the sheet metal chassis of a radio or television receiver, the base member 15, being provided with an elongated slot 16 therein. In the illustrated embodiment, a plug in rectifier, illustrated generally at 17, is arranged to be plugged into a pair of polarized receptacles 18 and 19, the receptacle 18 being positioned in an opening 20 in the base member 15 which is spaced from the end of the elongated slot 16 and the receptacle 19 being slidably positioned within the elongated slot 16 by means to be described hereinafter in more detail. The rectifier 17 is shown as comprising a tubular center post 23 (Fig. 6) and a plurality of rectifier plates 24 which are positioned transversely on the center post 23 by means of corrugated metallic washers 25 which function to space the rectifier plates 24 properly and electrically interconnect the same. A thin sheet metal terminal member 26 is provided with an annular end portion 27 positioned on the center post 23 in electrical contact with the end rectifier plate 28, the terminal member 26 being provided with a shank portion which extends beyond the edges of the plates 24 and terminates in a flat end portion 30 which is substantially parallel to the plates 24. On the other end of the rectifier 17 there is provided a corrugated washer 33 on the center post 23 which engages the end rectifier plate 34 and spaces the annular head portion 35 of a second terminal member 36 away from the plate 34 so as to permit the end portion 37 of the terminal 36 to be twisted approximately 90° from the annular head portion 35 thereof and into a plane substantially perpendicular to the plane of the plates 24. A pair of internal toothed washers 40 and 41 are crimped onto the ends of the center post 23 so as to hold the rectifier plates in proper stacked relation and a pair of end plates 42 and 43 of insulating material are provided to protect the terminal assemblies.

In accordance with one feature of the invention the end portions 30 and 37 of the terminal members 26 and 36 respectively, are provided with facilities for making a solder connection to the terminal member so that either conventional solder connections can be made to the terminals of the rectifier 17 or the rectifier may be plugged into the receptacles 18 and 19 to which receptacles electrical connections are permanently made. More particularly, each of the end portions 30 and 37 is provided with an elongated opening 45, adapted to receive one or more bare wire conductors and a pair of opposed notches 46 around which the ends of the conductors may be wrapped to provide a satisfactory solder joint.

The receptacles 18 and 19 are provided with top opening elongated slots 48 and 49 (Fig. 2) which are positioned correctly to receive the flat end portions 30 and 37 respectively, of the plug in rectifier 17. Each of the receptacles 18 and 19 is provided with electrical contact members which are adapted to engage the opposed flat surfaces of the rectifier terminal end portions and establish electrical contact thereto. Thus, the receptacle 19 is provided with the electrical contact member 55 (Fig. 9) having a pair of flat, bifurcated contact prongs 56 and 57 which are provided with inturned end portions which form the flat opposed contact fingers 58 and 59 which are adapted to engage the flat opposed surfaces of the end portion 37 of the rectifier terminal member 36.

The body of the receptacle 19 is provided with a vertically extending central bore 60 which is adapted to receive the contact prongs 56 and 57 of the contact member 55, the bore 60 being provided with an enlarged upper portion defining the shoulders 61 and 62 which are adapted to engage the hook portions 63 formed at the extremities of the contact prongs so that the contact member 55 may be snapped into place by forcing the same upwardly into the bore 60, the inclined upper edges of the hook portions 63 camming the bifurcated ends of the contact prongs 56 and 57 together so as to permit insertion of the contact member 55 into the bore 60. A pair of opposed sloping shoulders 65 and 66 are provided on the receptacle 19 so as to guide the rectifier terminal into engagement with the contact fingers 58 and 59 and to prevent the contact members 55 from being forced upwardly out of the receptacle 19.

In order slidably to position the receptacle 19 within the elongated slide 16, the body portion of the receptacle 19 is provided with the overhanging shoulders 70 and 71 which are adapted to ride on the edges of the base member 15 adjacent the elongated slot 16 and a resilient retaining ring 73 is provided which is adapted slidably to retain the receptacle 19 within the slot 16. More particularly, the receptacle 19 is provided with the opposed sloping sidewalls 74 and 75 which communicate with a pair of opposed sidewall recesses 76 and 77 formed in the upper portion of the receptacle 19 and the retaining ring 73 is provided with a pair of opposed, inwardly extending lug portions 78 and 79 which are adapted to be snapped into place within the sidewall recesses 76 and 77, the side bars 80 and 81 of the retaining ring 73 being curved so as to bias the end bars 82 and 83 thereof into engagement with the underside of the base member 16 so that the receptacle 19 is slidably retained within the slot 16.

In accordance with a further feature of the invention, the opposed flat contact fingers 58 and 59 of the contact member 55 are provided with opposed inwardly extending projections 85 thereon which are positioned at the outer edges of the fingers 58 and 59 and are adapted to interlock with the opposed notches 46 in the terminal end portion 47 when the rectifier terminal member is positioned within the receptacle 19. Preferably, the projections 85 are positioned along the length of the contact fingers 58 and 59 so that they interlock with the notches 46 when the bottom edges of the end rectifier plates 28 and 34 are positioned on the top surfaces of the receptacles 18 and 19 so that a rigid, shakeproof mounting is provided for the plug in rectifier 17.

Considering now the manner in which the plug in rectifier assembly of the present invention may be readily adapted to receive rectifiers of widely different terminal spacings and numbers of plates, it will be evident that the receptacle 19 may be readily adjusted relative to the fixed receptacle 18 by merely sliding the receptacle 19 along the length of the slot 16 against the spring bias of the retaining ring 73. Also, it would be noted that since the fixed receptacle 18 is positioned in line with and is spaced from the end of the elongated slot 16, a large variation in rectifier sizes can be accommodated. Thus, in Fig. 2 there is shown a plug in rectifier indicated generally at 90 which has a considerably larger number of plates than the plug in rectifier 17 so that the spacing of the terminal end portions 30a and 37a thereof is substantially greater than the corresponding spacing of the end portions 30 and 37 in the plug in rectifier 17. However, by merely adjusting the position of the receptacle 19 within the slot 16, the rectifier 90 may be plugged into the receptacles 18 and 19 without the use of any tools or other equipment. Accordingly, the same chassis mounting arrangement may be used in television receivers having different tube complements and requiring rectifiers of different ratings so that mass production methods may be employed in the construction thereof. Furthermore, if it is desired to change the size of the rectifier, it is only necessary to adjust the position of the movable receptacle 19 to conform to the terminal spacing of the new rectifier so that design changes may be readily effected.

In Fig. 3 there is shown a power type selenium rectifier which also embodies the plug in mounting arrangement of the present invention. In power rectifiers such as that shown in Fig. 3, it is customary to provide a plurality of taps or intermediate terminal members so that the rectifier may be employed in single phase or polyphase bridge circuits. Thus, in Fig. 3 the power rectifier 100 is provided with a first terminal member 101 having a flat end portion substantially parallel to the plates 102 of the rectifier 100, and a plurality of other terminal members 103 and 104 having flat end portions which are substantially perpendicular to the plane of the plates 102. A mounting rod 105 is positioned within the tubular center post 106 of the rectifier 100 and is provided with threaded end portions 107 and 108 which extend beyond the ends of the rectifier, the nuts 109 and 110 being provided to hold the rectifier plates in stacked relation on the center post 106.

In order to provide a shakeproof mounting for the rectifier 100 there is provided a pair of mounting brackets 112 and 113 which are secured to the base member 114 by means of the bolts 115 and 116 and extend upwardly from the base member 114. The brackets 112 and 113 are provided with vertically extending notches 118 and 119, respectively in the upper edges thereof which are adapted to receive the end portions 107 and 108 of the mounting rod 105. Accordingly, the rectifier 100 may be plugged into the receptacles 120, 121 and 122 and the end portions of the mounting rod 105 clamped to the brackets 112 and 113 by means of the quick-detachable thumb nuts 125 and 126. In this connection it will be understood that the base member 114 is provided with a suitable elongated slot 127 so that the receptacles 121 and 122 may be adjusted as desired to conform to the spacing of the terminal members 103 and 104. It will also be understood that additional receptacles may be slidably mounted within the slot 127 in the event that additional rectifier terminals are required.

In Fig. 5 there is shown a further alternative embodiment of the invention wherein the rectifier may be mounted in a shakeproof manner while providing individual receptacles for each rectifier terminal which do not need to be mounted on the base member. Thus, the power rectifier 130 is illustrated in Fig. 5 as mounted in a shakeproof manner between the brackets 112 and 113 with the sides of the rectifier plates 131 resting on the base member 132 so that an extremely rugged rectifier mounting arrangement is provided while permitting the rectifier to be readily removed by removing the thumb nuts 125 and 126. Electrical contact to the terminal members of the rectifier 130 is established through a plurality of flexible conductors 133, 134, 135, 136 and 137 by means of a plurality of receptacles 138, 139, 140, 141 and 142 attached to the ends of these conductors. In this connection it will be understood that the receptacles 138 to 142, inclusive, may be substantially identical to the receptacle 19 described in detail above, although the retaining ring 73 is not required in the flexible lead mounting arrangement shown in Fig. 5. It will also be understood that when the rectifier is mounted in the manner shown in Fig. 5 the intermediate terminals need not be polarized as described above in connection with the mounting arrangement shown in Fig. 3 but other suitable polarizing means may be provided to distinguish the flexible leads one from the other and prevent improper electrical connection to the rectifier terminals.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent of the United States is:

1. A plug in rectifier assembly, comprising a rectifier of the dry surface contact type provided with a plurality of plates held in stacked relationship and having at least a pair of terminal members electrically connected to certain ones of said plates, said terminal members having end portions consisting of flat contact prongs positioned in mutually perpendicular planes, a base member, a first contact receptacle of insulating material positioned on said base member and having a top opening elongated slot therein, means defining an elongated slot in said base member, a second receptacle of insulating material positioned in said elongated slot in said base member, said second receptacle having a top opening elongated slot therein extending perpendicularly to said elongated slot in said first receptacle, and electrical contact members in said first and second receptacles accessible through said slots and adapted to engage said contact prongs and establish electrical contact therewith, said second receptacle being slidable within said elongated slot in said base member whereby substantial variations in the spacing of said contact prongs may be accommodated by adjusting the position of said second receptacle within said elongated slot in said base member.

2. A plug in rectifier assembly, comprising a rectifier of the dry disc type having at least two spaced terminal members extending transversely therefrom, a base member having an elongated slot therein, a first receptacle of insulating material positioned on said base member and spaced from the end of said elongated slot, and a second receptacle of insulating material positioned in said elongated slot, said receptacles having electrical contact members thereon adapted to receive said terminal members and establish electrical contact therewith, said second receptacle being slidable within said elongated slot so that substantial variations in the spacing of said terminal members may be accommodated by adjusting the position of said second receptacle within said elongated slot.

3. A plug in rectifier assembly, comprising a rectifier of the dry disc type having at least two spaced terminal members thereon, a base member, first and second receptacles of insulating material positioned on said base member, said first and second receptacles each having electrical contact members thereon adapted to receive said rectifier terminal members and establish electrical contact therewith, one of said receptacles being movable on said base member with respect to the other of said receptacles so that substantial variation in the spacing of said contact prongs may be accommodated by adjusting the position of said one receptacle on said base member.

4. A plug in mounting arrangement for selectively mounting any one of a number of rectifiers provided with terminal members of different spacings, comprising a metallic base member, a plurality of individual receptacles of insulating material positioned on said base member, said receptacles each having electrical contact members thereon adapted individually to receive said rectifier terminal members and establish electrical contact therewith, at least one of said receptacles being movable on said base member with respect to another of said receptacles so that rectifiers having different terminal member spacings may be selectively plugged into said receptacles upon adjustment of the position of said movable receptacle.

5. A plug in rectifier, comprising a tubular supporting post of insulating material, a plurality of rectifier plates positioned transversely on said post, spacer means on said post between said plates for maintaining said plates in spaced relation and electrically interconnecting said plates, a pair of terminal members positioned on said post, each of said terminal members having an annular portion in electrical contact with one of said plates and an elongated shank portion extending beyond the edges of said plates, one of said shank portions having a flat end portion positioned in the plane of said plates and the other of said shank portions having a flat end portion positioned in a plane perpendicular to the plane of said plates.

6. A plug in rectifier, comprising a hollow tubular center post of insulating material, a plurality of rectifier plates positioned transversely on said center post, spacer means on said center post between said plates for maintaining said plates in spaced relation and electrically interconnecting the same, a pair of thin sheet metal terminal members each having an annular end portion positioned on said center post in electrical contact with one of said plates, said terminal members extending beyond the edges of said plates in a direction transversely to said center post and being provided with flat end portions which are positioned at right angles to one another.

7. A plug in rectifier assembly, comprising a tubular center post of insulating material, a plurality of rectifier plates positioned transversely on said center post in parallel spaced relation and electrically interconnected, a pair of terminal members electrically connected to different ones of said plates and extending in a direction perpendicular to said center post beyond the edges of said plates, said terminal members terminating in flat end portions which are positioned at right angles to one another, a base member, a first receptacle of insulating material on said base member and provided with an elongated slot positioned to receive the flat end portion of one of said terminal members, a second receptacle of insulating material on said base member and provided with an elongated slot which extends at right angles to the elongated slot in said first receptacle and is positioned to receive the flat end portion of the other of said terminal members, and electrical contact members in said first and second receptacles adapted to receive said flat end portions and establish electrical connection thereto, said second receptacle being movable on said base member with respect to said first receptacle so that substantial variation in the spacing of said end portions may be accommodated by adjusting the position of said movable receptacle on said base member.

8. A plug in rectifier assembly comprising a tubular center post of insulating material, a plurality of rectifier plates positioned transversely on said center post in parallel spaced relation and electrically interconnected, a pair of terminal members electrically connected to different ones of said plates and extending in a direction perpendicular to said center post beyond the edges of said plates, said terminal members terminating in flat end portions which are positioned at right angles to one another, a base member, a first receptacle of insulating material on said base member and provided with an elongated slot positioned to receive the flat end portion of one of said terminal members, a second receptacle of insulating material on said base member and provided with an elongated slot which extends at right angles to the elongated slot in said first receptacle and is positioned to receive the flat end portion of the other of said terminal members, electrical contact members in said first and second receptacles adapted to receive said flat end portions and establish electrical connection thereto, and cooperating locking means on said contact members and said end portions for holding said terminal members in said receptacles despite vibration of said base member.

9. A plug in rectifier assembly, comprising a tubular center post of insulating material, a plurality of rectifier plates positioned transversely on said center post in parallel spaced relation and electrically interconnected, a pair of terminal members electrically connected to different ones of said plates and extending in a direction perpendicular to said center post beyond the edges of said plates, said terminal members terminating in flat end portions which are positioned at right angles to one another, a base member, a first receptacle of insulating material on said base member and provided with an elongated slot positioned to receive the flat end portion of one of said terminal members, a second receptacle of insulating material on said base member and provided with an elongated slot which extends at right angles to the elongated slot in said first receptacle and is positioned to receive the flat end portion of the other of said terminal members, electrical contact members in said first and second receptacles each including a plurality of flat contact fingers adapted to engage the flat surfaces of said end portions and establish electrical contact thereto, at least one of said contact fingers having an inwardly extending projection thereon, the cooperating one of said end portions having an opening therein adapted to receive said projection, thereby to retain said terminal members within said receptacles despite vibration of said base member.

10. A plug in rectifier assembly, comprising a rectifier having a tubular center post, a plurality of rectifier plates positioned transversely on said center post in parallel spaced relation and a pair of terminal members electrically connected to different ones of said plates and terminating in flat end portions extending beyond the edges of said plates and arranged in predetermined configuration, a base member having an elongated slot therein, a first receptacle of insulating material positioned on said base member beyond the end of said elongated slot, a second receptacle of insulating material having a body portion insertable into said elongated slot and provided with shoulders adapted to engage the sides of said elongated slot, and means for slidably retaining said body portion within said elongated slot with said shoulders resting on the sides of said slot, said receptacles each having electrical contact members thereon positioned to receive said flat end portions and establish electrical connection thereto.

11. A plug in rectifier assembly, comprising a rectifier having a tubular center post, a plurality of rectifier plates positioned transversely on said center post in parallel spaced relation and a pair of terminal members electrically connected to different ones of said plates and terminating in flat end portions extending at right angles to one another and positioned beyond the edges of said plates, a base member having an elongated slot therein, a first receptacle of insulating material positioned on said base member beyond the end of said elongated slot, a second receptacle of insulating material having a body portion insertable into said elongated slot and provided with shoulders adapted to engage the sides of said elongated slot, said body portion having opposed sloping side walls communicating with side wall recesses which are spaced from said shoulders by an amount greater than the thickness of said base member, and a retaining ring adapted to be positioned over said body portion and having opposed inwardly extending lug portions adapted to fit into said side wall recesses and retain said ring in resilient engagement with the underside of said base member, whereby said second receptacle is slidably retained within said elongated slot in said base member, said receptacles each having electrical contact members thereon positioned to receive said flat end portions and establish electrical connection thereto.

12. A shakeproof, plug in rectifier assembly, comprising a rectifier having a tubular center post of insulating material, a plurality of rectifier plates positioned transversely on said center post in parallel spaced relation and a pair of terminal members electrically connected to different ones of said plates and terminating in flat end portions positioned beyond the edges of said plates, a base member having a pair of terminal receptacles of insulating material positioned in spaced apart relation on said base member and having top opening recesses therein adapted to receive said terminal end portions, electrical contact members in said recesses, a mounting rod extending through said tubular center post and having threaded end portions extending beyond the ends of said center post, a pair of mounting brackets secured to said base member and extending upwardly therefrom, said mounting brackets having aligned, vertically extending notches in the top edges thereof adapted to receive the end portions of said mounting rod, and quick-detachable clamping means for securing the ends of said mounting rod to said mounting brackets after said terminal end portions have been plugged into said receptacles.

13. A shakeproof rectifier mounting arrangement, comprising a rectifier having a tubular center post of insulating material, a plurality of rectifier plates positioned transversely on said center post in parallel spaced relation and a plurality of terminal members electrically connected to said plates and extending transversely from said center post beyond the edges of said plates, a mounting rod extending through said tubular center post and having threaded end portions extending beyond the ends of said center post, a base member, a pair of mounting brackets secured to said base member and extending upwardly therefrom, said mounting brackets having aligned vertical notches in the top edges thereof adapted to receive the end portions of said mounting rod, quick-detachable clamping means for securing the ends of said mounting rod to said mounting brackets, and individual receptacle members for each of said terminal members, each of said receptacle members having electrical contact means thereon for establishing electrical connection to said terminal members.

14. A plug-in rectifier assembly, comprising a rectifier of the dry surface contact type provided with a plurality of plates held in stacked relation and having at least a pair of terminal members electrically connected to certain ones of said plates, said terminal members having end portions consisting of flat contact prongs arranged in predetermined configuration, a base member, a first contact receptacle of insulating material positioned on said base member and having a top opening elongated slot therein, means defining a slot in said base member, second receptacle of insulating material positioned in said slot in said base member, said second receptacle having a top opening elongated slot therein, said elongated slots in said first and second receptacles being arranged in said predetermined configuration, and electrical contact members in said first and second receptacles accessible through said elongated slots and adapted to engage said contact prongs and establish electrical contact therewith, said second receptacle being slidable within said slot in said base member whereby substantial variations in the relative spacing of said contact prongs may be accommodated by adjusting the position of said second receptacle within said slot in said base member.

15. A plug-in rectifier assembly, comprising a rectifier of the dry surface contact type provided with a plurality of plates held in stacked relation and having at least pair of terminal members electrically connected to certain ones of said plates, said terminal members having end portions consisting of flat contact prongs arranged in predetermined configuration, a base member, a first contact receptacle of insulating material positioned on said base member and having a top opening elongated slot therein, means defining a slot in said base member, a second receptacle of insulating material positioned in said slot in said base member, said second receptacle having a top opening elongated slot therein, said elongated slots in said first and second receptacles being arranged in said predetermined configuration, electrical contact members in said first and second receptacles accessible through said elongated slots and adapted to engage said contact prongs and establish electrical contact therewith, said second receptacle being slidable within said slot in said base member whereby substantial variations in the relative spacing of said contact prongs may be accommodated by adjusting the position of said second receptacle within said slot in said base member, and cooperating locking means on said contact members and said prongs for holding said prongs in said receptacles despite vibration of said base member.

16. A plug-in rectifier assembly, comprising a rectifier of the dry surface contact type provided with a plurality of plates held in stacked relation and having at least a pair of terminal members electrically connected to certain ones of said plates, said terminal members having end portions consisting of flat contact prongs arranged in predetermined configuration, a base member, a first contact receptacle of insulating material positioned on said base member and having a top opening elongated slot therein, means defining a slot in said base member, a second receptacle of insluating material positioned in said slot in said base member, said second receptacle having a top opening elongated slot therein, said elongated slots in said first and second receptacles being arranged in said predetermined configuration, electrical contact members in said first and second receptacles each including a plurality of flat contact fingers adapted to engage the flat surfaces of said contact prongs and establish electrical contact therewith, at least one of said contact fingers having an inwardly extending projection thereon and the cooperating one of said contact prongs having an opening therein adapted to receive said projection, thereby to retain said contact prongs within said receptacles despite vibration of said base member, said second receptacle being slidable within said slot in said base member whereby substantial variations in the relative spacing of said contact prongs may be accommodated by adjusting the position of said second receptacle within said slot in said base member.

17. A plug in rectifier, comprising a hollow tubular center post of insulating material, a plurality of rectifier plates positioned transversely on said center post, spacer means on said center post between said plates for maintaining said plates in spaced relation and electrically interconnecting the same, a pair of thin sheet metal terminal members each having an annular end portion positioned on said center post in electrical contact with one of said plates, said terminal members extending beyond the edges of said plates in a direction transversely to said center post and being provided with flat end portions, one of said terminal members being twisted intermediate said end portions so that said flat end portion thereof is positioned at right angles to said flat end portion of the other of said terminal members.

18. A plug in rectifier, comprising a hollow tubular center post of insulating material, a plurality of rectifier plates positioned transversely on said center post, spacer means on said center post between said plates for maintaining said plates in spaced relation and electrically interconnecting the same, a pair of thin sheet metal terminal members each having an annular end portion positioned on said center post in electrical contact with one of said plates, said terminal members extending beyond the edges of said plates in a direction transversely to said center post and being provided with flat end portions, one of said terminal members being twisted intermediate said end portions so that said flat end portion thereof is positioned at a substantial angle to said flat end portion of the other of said terminal members.

References Cited in the file of this patent

UNITED STATES PATENTS

| | | |
|---|---|---|
| 1,805,572 | De Mask | May 19, 1931 |
| 2,274,089 | O'Brien | Feb. 24, 1942 |
| 2,289,172 | Beal | July 7, 1942 |
| 2,349,629 | Lazich et al. | May 23, 1944 |
| 2,456,572 | Wagstaff | Dec. 14, 1948 |

FOREIGN PATENTS

| | | |
|---|---|---|
| 707,695 | Great Britain | Apr. 21, 1954 |